United States Patent [19]

Clark

[11] Patent Number: 4,664,267
[45] Date of Patent: May 12, 1987

[54] GARMENT HANGER FOR MOTOR VEHICLE

[75] Inventor: David I. Clark, Rochester, Mich.

[73] Assignee: General Motors Corporation, Detroit, Mich.

[21] Appl. No.: 811,469

[22] Filed: Dec. 20, 1985

[51] Int. Cl.[4] .............................................. A47F 5/08
[52] U.S. Cl. .................................. 211/94; 211/162; 211/113
[58] Field of Search .................... 211/94, 162, 113; 248/231.2, 322, 339, 307, 221.3, 222.1, 215; 223/85, 88

[56] References Cited

U.S. PATENT DOCUMENTS

| 2,489,164 | 11/1949 | Shwayder | 211/94 X |
| 3,008,614 | 11/1961 | Ullery | 223/88 |
| 3,051,318 | 8/1962 | Murphy | 211/94 |
| 3,131,817 | 5/1964 | Schenkler | 223/88 X |

FOREIGN PATENT DOCUMENTS

| 163192 | 5/1958 | Sweden | 223/85 |
| 170348 | 2/1960 | Sweden | 211/162 |

Primary Examiner—Ramon S. Britts
Assistant Examiner—Blair M. Johnson
Attorney, Agent, or Firm—Charles E. Leahy

[57] ABSTRACT

A garment hanging device for a vehicle body includes a support attached to the vehicle body and defining a downwardly opening inverted U-shaped channel having opposed lip portions extending toward one another and providing an entry opening into a cavity. A garment hanger adapted to be removably affixed to the support has a garment hanging bow depending from an inverted J-shaped hook portion. The hook portion is adapted for entry upwardly into the entry opening of the support and has a distal end engageable with one of the lip portions of the channel. The hook portion of the garment hanger also has an inverted J-shaped hook latch portion pivotally mounted thereon and adapted for entry upwardly into the entry opening of the support and has a distal end engageable with the other lip portion of the channel. A spring acts between the hook portion and the hook latch portion to urge the hook latch portion away from the hook portion where by the garment hanger is secured within the cavity of the channel. A pushbutton handle provided on the hook latch portion and permits pivotal retracting movement of the hook latch portion toward the hook portion for removal of the garment hanger from the support.

1 Claim, 3 Drawing Figures

GARMENT HANGER FOR MOTOR VEHICLE

The invention relates to a garment hanger which latches onto a support attached to the vehicle body so that the hanger will not bounce off the support during vehicle movement.

BACKGROUND OF THE INVENTION

It is well known in motor vehicles such as passenger cars, vans, motor homes, and buses to provide a hook upon which a conventional clothes hanger may be engaged to carry a garment. A disadvantage of such conventional garment hanging systems is that the garment hangers tend to bounce off the garment hook when the vehicle hits a bump.

Accordingly, it would be desirable to provide a garment hanging system in which the garment hook would be more positively retained on the vehicle mounted garment hook so that the hanger would not bounce off the hook when the vehicle hits a bump or turns a corner.

SUMMARY OF THE INVENTION

According to the invention, a garment hanging device for a vehicle body includes a support attached to the vehicle body and defining a downwardly opening inverted U-shaped channel having opposed lip portions extending toward one another and providing an entry opening into a cavity. A garment hanger adapted to be removably affixed to the support has a conventional garment hanging bow which depends from an inverted J-shaped hook portion. The hook portion is adapted for entry upwardly into the entry opening of the vehicle mounted support and has a distal end engageable with one of the lip portions of the channel. The hook portion of the garment hanger also has an inverted J-shaped hook latch member which is pivotally mounted thereon and is adapted for entry upwardly into the entry opening of the support and has a distal end engageable with the other lip portion of the channel. A spring acts between the hook portion and the hook latch portion member to urge the hook latch member away from the hook portion whereby the respective distal ends thereof are maintained in engagement with the respective lip portions of the channel and the garment hanger is secured within the cavity of the channel. A pushbutton handle provided on the hook latch member and permits pivotal retracting movement of the hook latch portion toward the hook portion whereby the garment hanger may be removed from the support.

Accordingly, the object, feature and advantage of the invention resides in the provision of a downwardly open U-shaped channel support on the vehicle body and a garment hanger having a hook portion and a hook latch portion which are inserted upwardly into the support and retain the garment hanger on the support.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
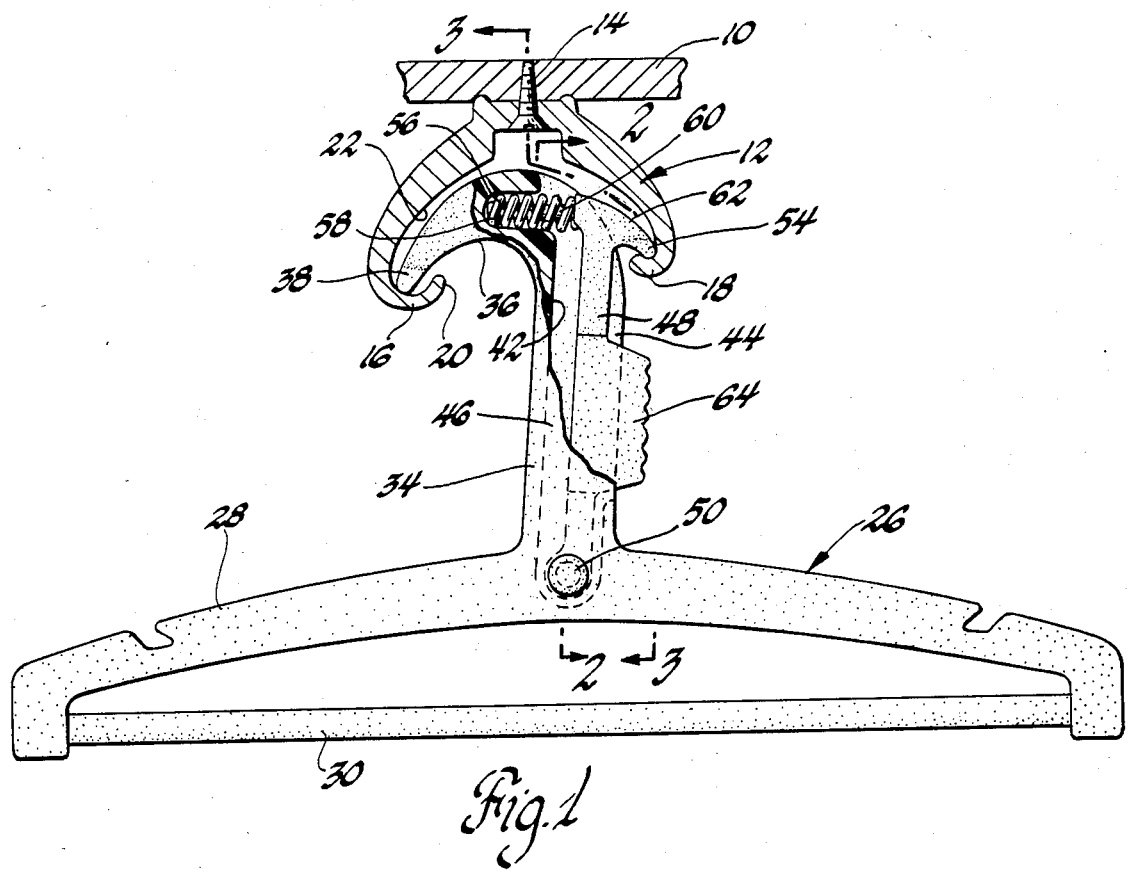
FIG. 1 is an elevation view of the garment hanging device having parts broken away and in section.
Figure 3:
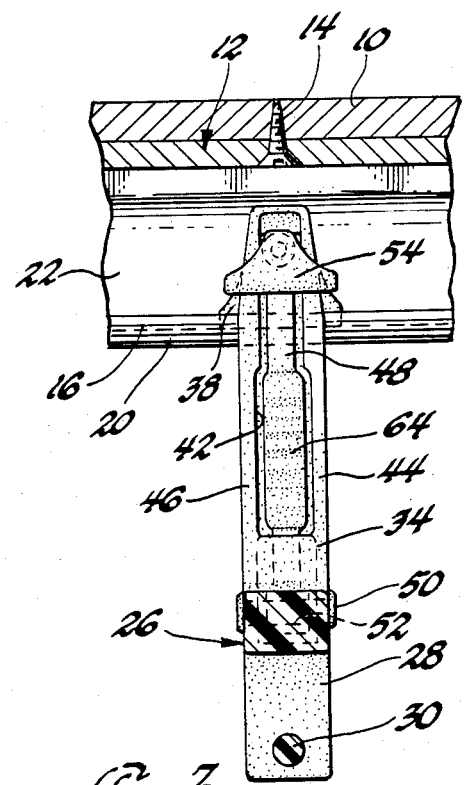
FIG. 3 is a sectional view taken in the direction of arrows 3—3 of FIG. 1.

Referring to FIG. 1, a vehicle body roof panel 10 extends generally horizontally and has a garment hanger support 12 attached thereto by one or more screws 14. The support 12, as best seen in FIGS. 1 and 3, is comprised of an extruded channel of metal or plastic having a generally inverted U-shape with opposed facing inwardly curled lip portions 16 and 18 which face toward one another and define an entry opening 20 which communicates with a cavity 22 defined by the support 12.

A garment hanger, generally indicated at 26, includes a conventional bow 28 for receiving the shoulders of a garment, a conventional cross bar 30 for receiving trousers, and an inverted J-shaped hook portion 34 which defines a hook recess 36 and a distal hook end 38. As best seen in FIG. 1, the hook portion 34 is adapted for entry upwardly into the entry opening 20 of the support 12 and the distal hook end 38 is adapted to hook onto the channel lip portion 16.

Figure 2:
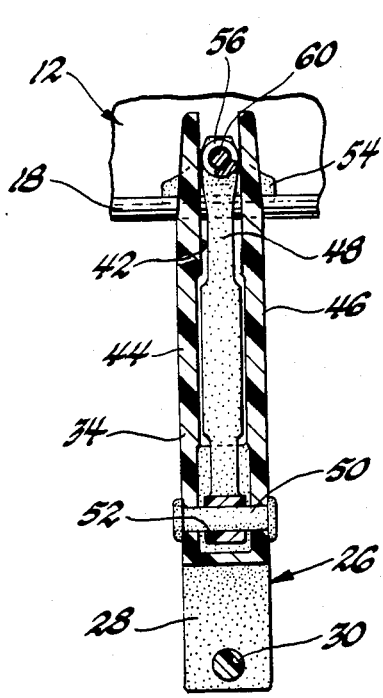
FIG. 2 is a sectional view taken in the direction of arrows 2—2 of FIG. 1.

As seen in FIGS. 1 and 2, the hook portion 34 of the garment hanger 26 has a central slot 42 defined between spaced apart walls 44 and 46. A hook latch member 48 is situated within the slot 42 of the hook portion 34 and is pivotally mounted thereon by a pivot pin 50 which extends between the walls 44 and 46 and through an aperture 52 at the lower end of the hook latch member 48.

As best seen in FIG. 1, the hook latch member 48 has an inverted J-shape including a distal end 54. A coil compression spring 56 seats within a cylindrical recess 58 of the hook portion 34 and seats upon a spring seat 60 of the hook latch member 48 and acts to bias the hook latch member 48 outwardly of the slot 42. When the hook portion 34 is entered upwardly into the entry opening 20 of the support 12, the curved top surface 62 of the distal end 54 cams against the lip portion 18 of the support 12 thereby retracting the hook latch member 48 further into the slot 42 of the hook portion 34 as permitted by yielding of the spring and pivoting of the hook latch member about the pivot pin 50.

Thus, as best seen in FIG. 1, the coil compression spring 56 acts to retain the distal hook end 38 of the hook portion 34 in engagement with the lip portion 16 of the support 12 while the spring 56 simultaneously acts to bias the hook latch member 48 away from the hook portion 34 so that the distal end 54 thereof is retained in engagement of the lip portion 18 of the support 12. Accordingly, as best seen in FIG. 1, the garment hanger 26 is securely retained within the cavity 22 of the support 12 and will not become dislodged therefrom when the vehicle hits a bump or when the vehicle turns a sharp corner.

As best seen in FIGS. 1 and 3, a pushbutton 64 is formed integrally on the hook latch member 48 and projects outwardly of the slot 42 beyond the hook portion 34. In order to disengage the garment hanger from the support 12, the user simply depresses the pushbutton 64 thereby pivoting the hook latch member 48 about the pivot pin 50 as permitted by yielding of the coil compression spring 56 so that the distal end 54 is withdrawn from engagement with the lip 18 of the support 12. Then the user may simply pivot the garment hook portion downwardly about its distal hook end 38 to remove the hook from the support 12.

It will be appreciated that the garment hanger 26 may be removed from the vehicle and may be conventionally hung over a closet rod in the conventional sense because the hook latch member 48 in no way interferes with the hook portion 34 hooking over the closet rod which is received into the recess 36.

It will also be understood that although the support 12 shown in the drawings as being an extrusion which is attached directly to the vehicle roof panel 10, the support 12 could be provided as an integral part of an occupant hand grip strap which many vehicles have attached to the roof thereof for facilitating occupant entry and egress from the vehicle.

Thus, it is seen that the invention provides a new and improved garment hanger for a motor vehicle in which the hanger is latched to a support on the vehicle whereby the hanger does not become dislodged from the support if the vehicle hits a bump.

The embodiments of the invention in which an exclusive property or privilege is claimed are defined as follows:

1. A garment hanger device for a motor vehicle comprising:

a support attached to the vehicle and defining a downwardly opening channel having opposed lip portions extending toward one another and providing an entry opening into a cavity;

a garment hanger removably affixed to the support, said hanger having a garment hanging bow depending from an inverted J-shaped hook portion, said hook portion adapted for entry upwardly into the entry opening of the support and having a distal end engageable with one of the lip portions, and said hook portion having an inverted J-shaped hook latch member pivotally mounted thereon at an extreme lower end thereof at the point of intersection between said inverted J-shaped hook portion and said bow and adapted for entry upwardly into the entry opening of the support and having a distal end engageable with the other lip portion of the channel;

spring means acting between the hook portion and the hook latch member and acting to bias the hook latch member pivotally away from the hook portion to thereby retain the respective distal ends thereof in engagement with the respective lip portions of the channel member whereby the hanger is retained within the cavity of the support;

said hook latch member having a curved top surface thereof adjacent the distal end and acting to cam against the channel lip portion upon entry of the garment hanger upwardly into the entry opening of the support so that the hook latch member is retracted toward the hook portion as permitted by yielding of the spring means to facilitate entry of the garment hanger upwardly into the entry opening of the support; and a pushbutton handle integral with the hook latch member and enabling pivotal movement of the hook latch member toward the hook portion as permitted by yielding of the spring means whereby the respective distal ends of the hook portion and the hook latch member may be disengaged from the lips of the support and the garment hanger removed from the support.

* * * * *